July 17, 1923.
N. V. WALLIS
TRAP
Filed Oct. 16, 1922
1,462,399
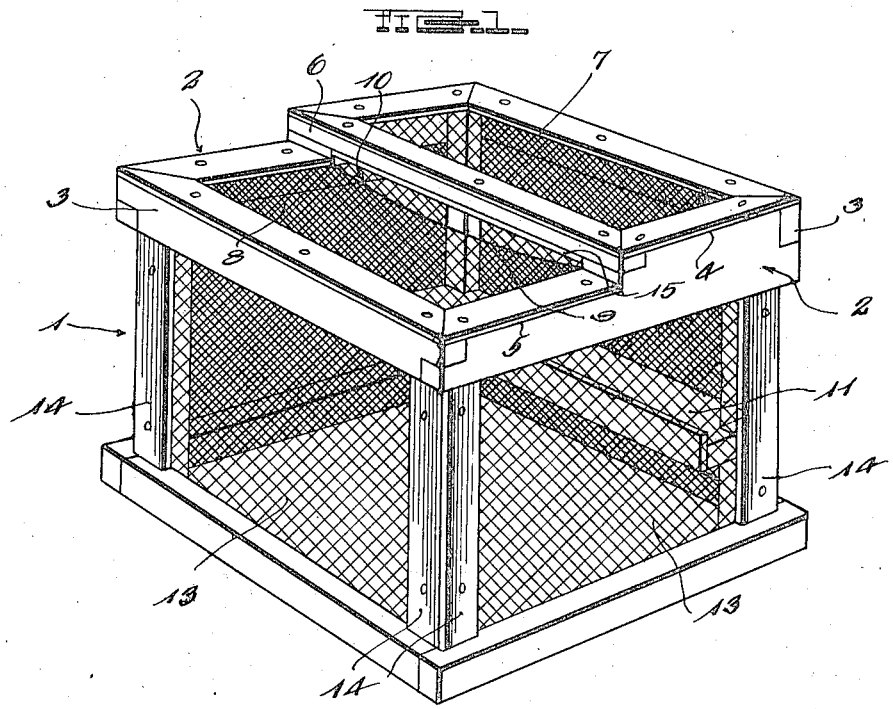
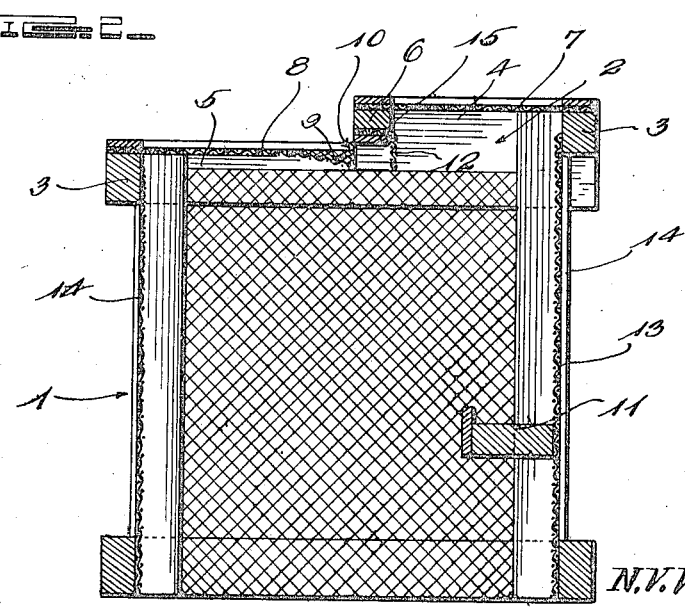
Inventor
N. V. Wallis Patented July 17, 1923.

1,462,399

UNITED STATES PATENT OFFICE.

NORMAN V. WALLIS, OF SAN ANTONIO, TEXAS.

TRAP.

Application filed October 16, 1922. Serial No. 594,807.

*To all whom it may concern:*

Be it known that I, NORMAN V. WALLIS, a citizen of the United States, residing at San Antonio, in the county of Bexar and State of Texas, have invented certain new and useful Improvements in Traps; and I do declare the following to be a full, clear, and exact description of the invention, such as will enable others skilled in the art to which it appertains to make and use the same.

My invention relates to improvements in traps and the present disclosure thereof is designed primarily for use in catching birds.

The object of the invention is to provide an extremely simple and inexpensive trap having a yieldable side wall disposed in two planes with an entrance opening between them, whereby entrance to the trap cage may be had by bowing one section of the wall away from the other section.

A further aim is to provide an internal flange for the entrance opening to prevent entrapped birds or other prey from gaining their freedom.

With the foregoing in view, the invention resides in the novel subject matter hereinafter described and claimed, the description being supplemented by the accompanying drawings.

Fig. 1 is a perspective view of a trap constructed in accordance with my invention.

Fig. 2 is a vertical sectional view.

In the form of construction herein disclosed, the numeral 1 designates a frame structure preferably, though not necessarily, formed of wooden strips secured together in such a manner as to provide a plurality of side frames, one of which, preferably the top frame, includes a pair of parallel side bars 2 connected by other bars 3 at their ends. The bars 2 have their opposite end portions off-set from each other and disposed in parallel planes, the outermost of these end portions being designated by the numeral 4, while the other end portions are referred to by the numeral 5. A cross bar 6 extends between and is secured to the inner ends of the portions 4 and one section 7 of a screen wire top is secured at its edges to said bar 6, the end portions 4 and the adjacent bar 3. The other section 8 of the screen wire top is secured to the portions 5 of the side bars 2 and to the other bar 3, its inner edge 9 being free and disposed in spaced relation with the bar 6 to which the inner edge of the section 7 is secured, thereby providing an entrance opening 10 through which birds may enter the trap, seeking to reach suitable bait which may well be placed in a trough or other receptacle 11. It will be understood that when the bird is entering the trap, it must force its way between the supporting bars 6 of the upper wire section 7 and the free downwardly bowed inner edge portion of the lower wire section 8. Since the section 8 is formed of flexible wire, its free inner edge portion can be flexed sufficiently to permit the bird to force its way through the inlet.

Extending downwardly from the bar 6 is a flange 12 preferably formed of screen wire, said flange serving to guard the inlet 10 so that it is practically impossible for an entrapped bird to pass outwardly through said inlet.

The vertical side frames of the trap are covered by screen wire or other desirable material, as indicated at 13, forming a complete cage which may be or may not be provided with a bottom. I preferably make use of strips of wood 14 in securing the several sheets of screen wire in place and a small strip may well be employed for anchoring the wire to the bar 6 which forms the flange 12, this strip being indicated by the reference numeral 15.

From the foregoing, it will be seen that a simple and inexpensive trap has been provided, yet one which will be highly efficient for catching birds or small animals. It will be understood that while the entrance opening 9 is not normally of sufficient size to permit entrance to the cage, the top section 8 will yield downwardly, permitting entrance to be forced.

As excellent results may be obtained from the details disclosed they are preferably followed, but within the scope of the invention as claimed, numerous minor changes may be made.

I claim.

1. A trap comprising a cage having a yieldable side wall formed of two sections disposed in spaced planes, having an entrance opening between them through which the prey may enter by springing one section away from the other section, the edge of the latter along said entrance opening being provided with a stiffening bar, and an inwardly extending flange carried by said bar and extending in spaced relation to the inner side edge of the other section.

2. A trap comprising a cage having a yieldable side wall formed of two sections disposed in spaced planes, having an entrance opening between them through which the prey may enter by springing one section away from the other section, the latter having an inwardly extending flange along said opening, guarding the same against egress.

3. A trap comprising a plurality of rectangular side frames, two side bars of one of said frames each having one end portion offset outwardly from its other end portion, a cross bar extending between the inner ends of said outwardly offset portions, and screen wire coverings for said side frames, the covering of said one frame being formed of two sections in spaced parallel planes leaving an entrance opening between them at the inner side of said cross bar, the inner edge portion of one of said sections being secured to said cross bar.

4. A trap comprising a cage having a top including closure strips positioned in planes one above the other and extending in opposite directions from a point intermediate the length of said top to provide an inlet between the edges of the sections, the lower closure strip being formed of flexible wire mesh and having its free inner edge portion bowed downwardly to facilitate passage inwardly through the inlet.

5. A trap comprising a cage having a top including closure strips positioned in planes one above the other and extending in opposite directions from a point intermediate the length of said top to provide an inlet between the edges of the sections, and a depending guard strip extending beneath the inner edge portion of the upper closure strip opposite the inlet in a plane substantially at right angles to the planes of the two closure strips.

6. The structure of claim 5 and a rigid supporting bar extending across the upper wall at the inlet and having the inner edge portion of the upper strip and the guard strip secured thereto.

In testimony whereof I have hereunto affixed my signature.

NORMAN V. WALLIS.